United States Patent [19]

Hashimoto et al.

[11] 4,328,562

[45] May 4, 1982

[54] MEANS FOR DISPLAYING AT LEAST TWO DIFFERENT WORDS AND FOR PROVIDING INDEPENDENT PRONUNCIATIONS OF THESE WORDS

[75] Inventors: Shintaro Hashimoto, Ikoma; Akira Tanimoto, Kashihara, both of Japan

[73] Assignee: Sharp Kabushiki Kaisha, Osaka, Japan

[21] Appl. No.: 113,296

[22] Filed: Jan. 18, 1980

[30] Foreign Application Priority Data

Jan. 20, 1979 [JP] Japan ................... 54-5717

[51] Int. Cl.³ .................... G06F 3/14; G06F 3/16
[52] U.S. Cl. .................. 364/900; 179/1 SM
[58] Field of Search ... 364/200 MS File, 900 MS File; 179/1 SM

[56] References Cited

U.S. PATENT DOCUMENTS 4,158,236  6/1979  Levy .................................. 364/900
4,159,536  6/1979  Kehoe et al. ....................... 364/900
4,215,240  7/1980  Ostrowski ........................ 179/1 SM
4,218,760  8/1980  Levy et al. ........................ 364/900

FOREIGN PATENT DOCUMENTS 2014765  8/1979  United Kingdom ............ 179/1 SM

*Primary Examiner*—Harvey E. Springborn
*Attorney, Agent, or Firm*—Birch, Stewart, Kolasch & Birch

[57] ABSTRACT

A portable electronic dictionary and language interpreter comprises an input device for simultaneously entering at least two different words in a first language, a translator for causing retrieval for equivalents for the at least two different words, and a voice synthesizer for speaking the at least two different words in the first language in the form of synthesized sounds, respectively. The pronouncing of both or either of the at least two different words in the first language can be selectively repeated in response to an actuation of a repeat key switch. The translated word or words now indicated in a display can be replaced by the input word or words once indicated in the same display.

12 Claims, 3 Drawing Figures

MEANS FOR DISPLAYING AT LEAST TWO DIFFERENT WORDS AND FOR PROVIDING INDEPENDENT PRONUNCIATIONS OF THESE WORDS

BACKGROUND OF THE INVENTION

The present invention relates in general to a word information storage and retrieval device and, more particularly, to an electronic dictionary and language interpreter for providing efficient and rapid retrieval of any desired word or words stored therein.

Recently, a new type of electronic device called an electronic dictionary and language interpreter has been available on the market. The electronic dictionary and language interpreter differs from any conventional type of electronic device in that the former is of a unique structure which provides for efficient and rapid retrieval of word information stored in a memory. An example of such electronic dictionaries and language interpreters was disclosed in Levy, U.S. Pat. No. 4,158,236, filed on June 12, 1979, and entitled "ELECTRONIC DICTIONARY AND LANGUAGE INTERPRETER".

There was filed a copending U.S. patent application Ser. No. 095,081 entitled "ELECTRONIC DICTIONARY AND LANGUAGE INTERPRETER WITH FACULTIES OF PRONOUNCING OF AN INPUT WORD OR WORDS REPEATEDLY", on Nov. 16, 1979, filed by the same applicants as the applicants of the present application. The U.S. patent application disclosed the means to provide and repeatedly pronunciate a single input word at the same time.

However, according to the teachings of the U.S. patent application, it is impossible that there may be pronounced at least two different input words at the same time. For the purpose of providing an audible comparison between different input words, it is desired that at least two different input words be pronounced at the same time.

OBJECTS AND SUMMARY OF THE INVENTION

Accordingly, it is the primary object of the present invention to provide an improved electronic dictionary and language interpreter comprising an apparatus for providing pronunciation of at least two different input words.

It is a further object of the present invention to provide an improved electronic dictionary and language interpreter comprising means for selectively providing pronunciation of at least two different input words.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a portable electronic dictionary and language interpreter comprises an input device for simultaneously entering at least two different words in a first language, a translator for causing retrieval for equivalents for the at least two different words, and a voice synthesizer for pronouncing the at least two different words in the first language in the form of synthesized sounds, respectively.

The pronouncing of both or either of the at least two different words in the first language can be selectively repeated in response to an actuation of a repeat key switch. The translated word or words now displayed in a display can be replaced by the input word or words once displayed in the same display.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

First of all, any kind of languages can be applied to an electronic dictionary and language interpreter of the present invention. An input "source" word or words are spelled in a specific language to obtain an equivalent word or words, or a translated word spelled in a different language corresponding thereto. The kind of the languages can be freely selected. According to an example of the present invention, it is assumed that the specific language is English and the different language is Japanese.

Figures 1, 2:
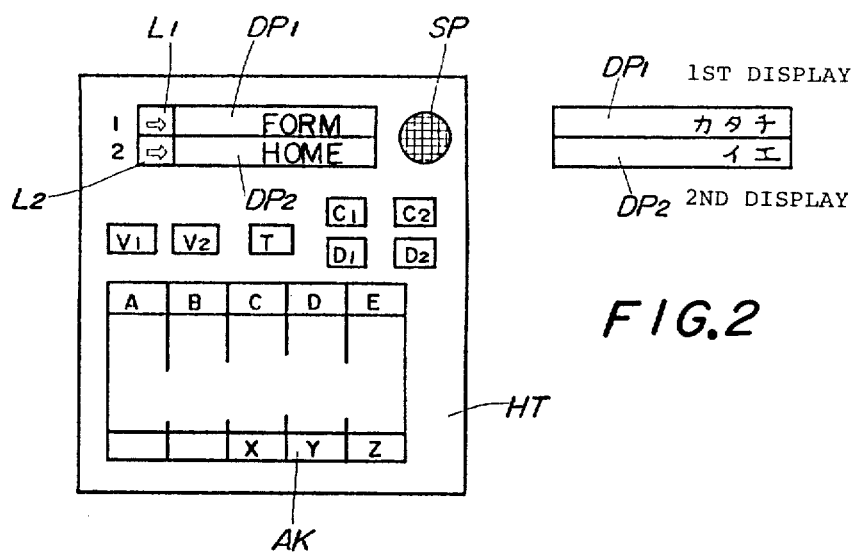
FIG. 1 is a plan view of an electronic dictionary and language interpreter according to the present invention.
FIG. 2 is a two-storied display incorporated into the electronic dictionary and language interpreter shown in FIG. 1.

Referring to FIG. 1, there is illustrated in a plan view an electronic dictionary and language interpreter of the present invention. The electronic dictionary and language interpreter comprises a main frame HT, an alphabetical keyboard AK, two displays $DP_1$ and $DP_2$ both indicative of input "source" word or words and a translated or "equivalent" word or words, two display indicators $L_1$ and $L_2$ both indicative of the kind of word or words being pronounced, two input keys $D_1$ and $D_2$, two pronunciation keys $V_1$ and $V_2$, a translation key T, two clear keys $C_1$ and $C_2$, and a speaker SP.

One or more English "source" words are introduced by the actuation of the alphabetical keyboard AK. Prior to the actuation of the alphabetical keyboard AK, either of the two input keys $D_1$ and $D_2$ is actuated to identify whether a desired English "source" word or words now entered belong to either of the first input word or words and the second input word or words. The first input word or words is specified according to the actuation of the input key $D_1$. On the other hand, the second input word or words are specified by virtue of the actuation of the other input key $D_2$.

If it is desired that an English "source" word "FORM" be introduced as the first input word or words, the input key $D_1$ is first actuated and then the alphabetical keyboard AK is actuated to produce code information equivalent to "FORM". Hence, "FORM" is indicated in the first display $DP_1$ as shown in FIG. 1. For the purpose to obtain a translated Japanese word or words corresponding to "FORM", the translation key T is actuated. In response to the actuation of the translation key T, a control circuit is operated to obtain a Japanese translated word " " equivalent to "FORM" as displayed in the first display $DP_1$ of FIG. 2, as mentioned hereinbelow. In response to the actuation of the translation key T, at the same time, audible prounciation of the first input word or words, say, "FORM", is provided as described below.

Concerning the second input word or words, similarly, the second input key $D_2$, the alphabetical keyboard AK, and the translation key T are subsequently actuated in this order. The second input word or words, say, "HOME", and its equivalent translated word or words, say " ", can be alternatively displayed in the second display $DP_2$. The audible pronunciation of "HOME" is also generated according to the actuation of the translation key T.

While the first input word or words are pronounced, the first indicator $L_1$ is illuminated for indication. Similarly, when the second input word or words are pronounced, the second indicator $L_2$ is illuminated for indication. The operations for the first and the second input word or words are independent. In other words, the operations for the second input word or words are not prevented by the entry operation and the delivery operation in connection with the first input word or words. The operations for the first input word or words are not affected by the entry status and the delivery status of the second input word or words.

The two pronunciation keys $V_1$ and $V_2$ are provided for mainly enabling the audible pronunciation of the first and the second input word or words, respectively. When either of the two pronunciation keys $V_1$ and $V_2$ are actuated, any retrieval, in finding out its equivalent translated word or words, is not effected so that the relevant display $D_1$ or $D_2$ continuously displays the associated input word or words. The audible pronunciation is provided under the condition that the word or words equivalent to the audible pronunciation are displayed in the display. According to alternative actuation of the two pronunciation keys $V_1$ and $V_2$, the audible prounciation of the first input word or words can be compared with that of the second input word or words.

Figure 3:
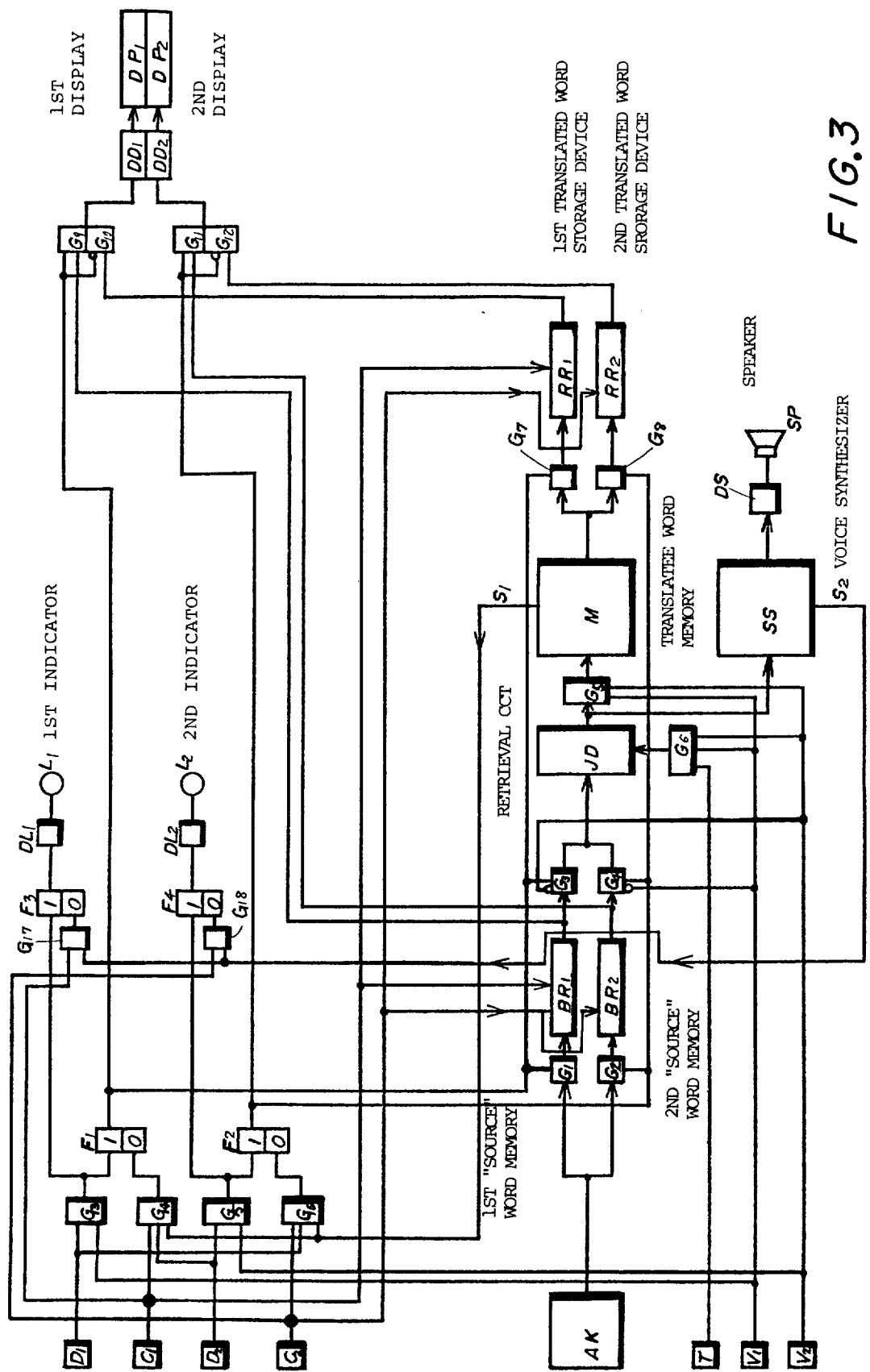
FIG. 3 is a block diagram of a control circuit according to the present invention incorporated into the electronic dictionary and language interpreter shown in FIG. 1.

FIG. 3 is a block diagram of a control circuit of the present invention incorporated into the electronic dictionary and language interpreter shown in FIG. 1. Like elements corresponding to those of FIG. 1 are indicated by like numerals. The control circuit mainly comprises a translated word memory M, a voice synthesizer SS a retrieval circuit JD, two "source" word memories $BR_1$ and $BR_2$, two translated word storage devices $RR_1$ and $RR_2$, and a driver DS.

The translated word memory M made of a read-only memory (ROM) contains a plurality of translated words in the form of code information. The voice synthesizer SS produces audible information applied to the driver DS and then the speaker SP. The driver DS is provided for driving the speaker SP. The voice synthesizer SS includes an appropriate number of ROMs to form the audible information.

The first "source" word memory $BR_1$ and the first translated word storage device $RR_1$ are both related to the first input word or words. The second "source" word memory $BR_2$ and the second translated word storage device $RR_2$ are both associated to the second input word or words.

The retrieval circuit JD is responsive to binary code information from either the first or the second "source" word memories $BR_1$ and $BR_2$ to address one or more appropriate regions of the translated word memory M and the voice synthesizer SS.

The first and the second translated word storage devices $RR_1$ and $RR_2$ are provided for temporarily containing one or more translated words delivered from the translated word memory M in the form of binary code information.

The voice synthesizer SS includes a D/A converter for converting digital audible data into analog information. There are generated signals $S_1$ indicative of the termination of the retrieval and signals $S_2$ representative of the termination of the audible pronunciation. There are connected four R-S type flip flops $F_1$ through $F_4$. There are provided two displays $DP_1$ and $DP_2$ related to that shown in FIG. 1. There are coupled two drivers $DD_1$ and $DD_2$ for controlling the related displays. Elements shown by $L_1$ and $L_2$ are associated to the indicators $L_1$ and $L_2$ shown in FIG. 1. There are provided two driver circuits $DL_1$ and $DL_2$ acting for display indicators $L_1$ and $L_2$. There are coupled a plurality of gate circuits $G_1$ through $G_{18}$. The operations of the control circuit will now be explained hereinbelow.

Retrieval for Translated Word or Words

In connection with the first input word or words, the first input key $D_1$ is actuated so that the flip flop $F_1$ is turned set, in which case the code information entered by the alphabetical keyboard AK is admitted to the first "source" word memory $BR_1$. For the purpose of the following retrieval, the two gate circuits $G_1$ and $G_3$ are turned conductive.

More particularly, when it is assumed that the alphabetical keyboard AK is actuated to enter "FORM", respective binary code information equivalent to four characters, say "F", "O", "R", "M" is subsequently introduced into the first "source" word memory $BR_1$. The actuation of the first input key $D_1$ makes the flip flop $F_1$ set through the gate circuit $G_3$ and makes the flip flop $F_2$ reset through the gate circuit $G_{16}$. Even if the flip flop $F_2$ has been set, the first input key $D_1$ enables the flip flop $F_2$ reset. According to the set conditions of the flip flop $F_1$, the gate circuit $G_9$ is turned conductive. The contents of the first "source" word memory $BR_1$ are applied to the first driver $DD_1$ so that the first display $DP_1$ displays the entered first input word or words. The flip flop $F_3$ is also turned set with the aid of the gate circuit $G_3$ responsive to the first input key $D_1$. The first display indicator $L_1$ is illuminated for representing that the first input word or words are introduced.

Under the circumstances, the translation key T is actuated so that retrieval start signals are applied to the retrieval circuit JD through the gate circuit $G_6$. Since the gate circuit $G_3$, coupled to the first "source" word memory $BR_1$ and the retrieval circuit JD, is placed in conductive states, the contents of the first "source" word memory $BR_1$ are transferred into the retrieval circuit JD. The retrieval circuit JD addresses the translated word memory M and the voice synthesizer SS synthesizes audible sounds according to the contents stored therein. Retrieval translated word or words from the translated word memory M is introduced into the translated word storage device $RR_1$ through the gate circuit $G_7$ which is placed in conductive stage. Audible information equivalent to "FORM" is delivered from the voice synthesizer SS is applied to the driver DS and then to the speaker SP.

The voice synthesizer SS contains the memory and the D/A converter. The memory preliminarily stores quantum voice information used for providing the pronunciation equivalent to the input word or words. The D/A converter operates to convert the quantum voice information from the memory to analog information applied to the speaker driver DS. The speaker SP is controlled by the speaker driver DS so that the input word or words are pronounced in the same manner as of reading the same.

The memory contains a number of words in the form of quantum voice information in order to provide a plurality of different kinds of pronunciation according to a plurality of input words. To provide the plurality of different kinds of the pronunciation due to a plurality of letters of only one English word, the plurality of words defined by the quantum voice information are required to be stored in the memory. Each of the plurality of words are placed in such a manner that they are positioned in the first region where the plurality of the words are arranged in a certain sequence on a one-step basis, and the second region where the end code information following the last word is stored for the confirmation of the termination of the words.

When the retrieval for the translated word or words equivalent to the first input word or words is terminated, the translated word memory $M_1$ provides signals $S_1$ representative of the termination of the retrieval. The signals $S_1$ are admitted to the gate circuit $G_{14}$ coupled to the flip flop $F_1$. The flip flop $F_1$ is turned reset so that the gate circuit $G_9$ is placed in nonconductive stage and the gate circuit $G_{10}$ is placed in conductive state. Then the delivered translated word or words stored in the translated word storage device $RR_1$ are indicated in the first display $DP_1$ through the gate circuit $G_{10}$ with the help of the first driver $DD_1$.

Concerning the second input word or words, the second input key $D_2$ is initially actuated for identification. In response to the actuation of the second input key $D_2$, the flip flop $F_2$ is turned set and the flip flop $F_1$ is turned reset. The gate circuit $G_{11}$ becomes conductive in response to the set state of the flip flop $F_2$. The second display $DP_2$ is set to display the contents of the second "source" word memory $BR_2$. When the second input word or words are introduced into the second "source" word memory $BR_2$ with the aid of the actuation of the alphabetical keyboard AK, the alphabetical character data contained within the second "source" word memory $BR_2$ are displayed in the second display $DP_2$. The gate circuit $G_2$ coupled to the second "source" word memory $BR_2$ is turned conductive in response to the set state of the flip flop $F_2$ so that the alphabetical character data generated from the alphabetical keyboard AK are transferred into the second "source" word memory $BR_2$.

Since the gate circuit $G_4$ interposed between the second "source" word memory $BR_2$ and the retrieval circuit JD is also turned conductive in response to the set state of the flip flop $F_2$, the alphabetical character data are transferred from the second "source" word memory $BR_2$ to the retrieval circuit JD in response to the actuation of the translation key T. The retrieval circuit JD drives the translated word memory M so as to obtain a translated word or words equivalent to the alphabetical character data contained within the retrieval circuit JD and also drives the voice synthesizer SS in order to provide audible pronunciation equivalent to the alphabetical character data.

The translated word or words generated from the translated word memory M are forwarded to the second translated word storage device $RR_2$ and then applied to the second display $DP_2$ through the conductance of the gate circuit $G_{12}$ by means of the flip flop $F_2$ placed in the set state. Thus the translated word or words are displayed in the second display $DP_2$.

When the input key $D_2$ is actuated, setting the flip flop $F_4$, the second indicator $L_2$ is illuminated when the signals $S_2$ are developed from the voice synthesizer SS, the generation of the audible pronunciation equivalent to the alphabetical character data is completed.

As described above, the retrieval of the translated word or words equivalent to the input word or words and the generation of the audible pronunciation of the input word or words are independent in connection with the first and the second input word or words.

The first clear key $C_1$ is provided for canceling information contained within the first "source" word memory $BR_1$ and the first translated word storage device $RR_1$, namely, for placing them reset. Instead, to suppress information to be displayed is equivalent to cause reset operation of these elements $BR_1$ and $RR_1$. The second clear key $C_2$ is provided for turning both the second "source" word memory $BR_2$ and the second translated word storage device $RR_2$ reset. The gate circuit $G_{17}$ is conductive responsive to the actuation of the first clear key $C_1$ so that the flip flop $F_3$ is turned reset. The gate circuit $G_{18}$ is conductive responsive to the actuation of the second clear key $C_2$ so that the flip flop $F_3$ is turned reset.

Two Pronunciation Keys $V_1$ and $V_2$

Under the conditions where the first input key $D_1$ is actuated and the first input word or words are entered by means of the alphabetical keyboard AK, the first pronunciation key $V_1$ is actuated so as to enable the retrieval circuit JD to cause the retrieval for the equivalent audible pronunciation. The gate circuit $G_5$ is prevented by means of the actuation of either the first pronunciation key $V_1$ or the second pronunciation key $V_2$.

The gate circuits $G_3$ and $G_4$ interposed between first "source" word memory $BR_1$ and the retrieval circuit JD are turned nonconductive by means of the actuation of the second pronunciation key $V_2$ and the first pronunciation key $V_1$, respectively.

Thus the output signals from the retrieval circuit JD are applied only to the voice synthesizer SS but not to the translated word memory M. Therefore, the audible pronunciation is only available using the voice synthesizer SS under the control by the retrieval circuit JD.

Though the translation key T is actuated, the signals $S_1$ from the translated word memory M function to make the flip flop $F_1$ reset so that the translated word or words stored in the translated word storage device $RR_1$ are no longer displayed in the first display $DP_1$. On the other hand, in connection with the first pronunciation key $V_1$, the signals $S_1$ are not generated from the translated word memory M, because the memory M is not used ($G_5$ being non-conductive) so that the flip flop $F_1$ is kept set. The input word or words contained within the first "source" word memory $BR_1$ are therefore continuously displayed in the first display $DP_1$. Each time, the first pronunciation, equivalent to the first input word or words entered, is generated with the voice synthesizer SS.

The second pronunciation key $V_2$ is employed to provide the audible pronunciation equivalent to the second input word or words. Under the conditions where the first pronunciation key $V_1$ is actuated to provide the audible pronunciation equivalent to the first input word or words, it is assumed that the second pronunciation key $V_2$ is also activated. Immediately before the activation of the second pronunciation key $V_2$, the flip flop $F_1$ is placed in the set state.

The actuation of the second pronunciation key $V_2$ enables the gate circuit $G_3$ to become nonconductive. According to the actuation of the second pronunciation key $V_2$, the character data stored in the first "source" word memory $BR_1$ are not transferred into the retrieval circuit JD but that of the second "source" word memory $BR_2$ are transmitted into the retrieval circuit JD. On the contrary, if the second pronunciation key $V_2$ is first actuated and the first pronunciation key $V_1$ is subsequently energized, the gate circuit $G_4$ is turned nonconductive. Thus the character data within the first "source" word memory $BR_1$ are selectively transferred into the retrieval circuit JD.

After the translation key T is actuated, the two flip flop $F_1$ and $F_2$ are turned reset according to the generation of the signals $S_1$ developed from the translated word memory M. In such a case, the two displays $DP_1$ and $DP_2$ are adapted to display the respective translated words. Under the circumstances, the first pronunciation key $V_1$ is actuated so that the flip flop $F_1$ is turned set through the use of the gate circuit $G_3$. Then the character data stored in the first "source" word memory $BR_1$ are displayed in the first display $DP_1$. Needless to say, according to the actuation of the first pronunciation key $V_1$, the audible pronunciation equivalent to the character data stored within the retrieval circuit JD is generated. Similarly, according to the actuation of the second pronunciation key $V_2$, the flip flop $F_2$ is turned set so that the character data stored in the second "source" word memory $BR_2$ are altered to be displayed in the second display $DP_2$. Of course, in response to the actuation of the second pronunciation key $V_2$, the audible pronunciation, equivalent to the character data within the retrieval circuit JD, is provided.

As explained above in detail, the present invention features the following characters.

(1) At least two different input words can be subjected to retrieval. The audible pronunciation of each of the two input words are provided.

(2) At least two different input words are visible at the same time. After retrieval of the translated word equivalent to each of the two input words, the translated word is displayed in the display in place of each of the input words.

(3) At least two different input words are indicated at the same time. Both or either of the two different input words can be selectively spoken.

(4) Under the condition that the two different input words are entered, and that the translated word or words equivalent to each of them are obtained with the aid of retrieval, the audible pronunciation is repeatedly provided. The translated word or words now displayed can be replaced by the input word or words once indicated.

(5) There is a display indicator for displaying which of the first and the second input word or words is now being spoken.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic dictionary and language interpreter device wherein first words represented in a first language are entered to obtain second words represented in a second language, the second words being equivalent to the first words, comprising:

input means for entering at least two different input first words into said language interpreter device;

memory means for containing a plurality of the second words equivalent to the first words;

access means connected between the input means and the memory means and responsive to entry of the first words via said input means for addressing the memory means to retrieve the second words therefrom, the second words being equivalent to the two first words; and voice synthesizer means connected to the access means and resposive to the first words entered via said input means for selectively providing an audible pronunciation of either the first one of the input first words or the second one of the input first words.

2. The device according to claim 1, further comprising storage means connected between the input means and the access means for storing the two different input first words therein: and means connected between the storage means and the access means for selectively permitting the two different input first words stored in the storage means to enter into the access means.

3. The device according to claim 1, wherein the memory means comprises a read-only memory (ROM).

4. The device according to claim 1, further comprising speaker means connected to the voice synthesizer means.

5. The device according to claim 1, wherein the input means comprises an alphabetical keyboard.

6. The device according to claim 1, further comprising clear key means for completely cancelling either of the at least two different input first words entered into said device via said input means.

7. The device according to claim 1, further comprising:

means for controlling the voice synthesizer means to selectively individually pronounce the first one of the input first words has the second one of the input first words;

whereby the first one and the second one of the input first words may be audibly compared with each other.

8. The device according to claim 7, wherein said means for controlling said voice synthesizer means comprises repeat means for repeatedly activating the voice synthesizer means to cause repeated generation of the individual audible pronunciation of the first one of the input first words and the second one of the input first words.

9. The device according to claim 8, further comprising:

display means connected to the input means and responsive to the entry of the two different input first words entered via said input means for displaying both of the two different input first words, the display means being further connected to the memory means for displaying the second words retrieved from said memory means.

10. The device according to claim 9, including means for changing the display of the second words appearing on said display means to a display of the input first words in response to the activation of said repeat means, the display of the input first words appearing approximately simultaneously with the selective generation of the audible pronunciation of the first and second input first words.

11. The device according to claim 9, wherein said repeat means comprises:
   gate means connected between said access means and said memory means; and
   key means on said language interpreter device and connected to said gate means for turning said gate means to a non-conductive condition in response to actuation thereof,
   said access means no longer addressing said memory means when said gate means is in said non-conductive condition,
   the means for changing said display means changing the display from the display of the second words to the display of the input first words when said access means no longer addresses said memory means.

12. The device according to claim 1, further comprising display means for displaying which one of the first or second input first words is being pronounced via said voice synthesizer means.

* * * * *